United States Patent
Ko et al.

(10) Patent No.: US 12,495,250 B2
(45) Date of Patent: Dec. 9, 2025

(54) DISPLAY

(71) Applicant: BENQ CORPORATION, Taipei (TW)

(72) Inventors: Chun-Min Ko, Taipei (TW); Chih Heng Lee, Taipei (TW); Change Kuo Chen, Taipei (TW); Li Hsin Wu, Taipei (TW)

(73) Assignee: BenQ Corporation, Taipei (TW)

( * ) Notice: Subject to any disclaimer, the term of this patent is extended or adjusted under 35 U.S.C. 154(b) by 252 days.

(21) Appl. No.: 18/326,028

(22) Filed: May 31, 2023

(65) Prior Publication Data
US 2024/0205602 A1 Jun. 20, 2024

(30) Foreign Application Priority Data
Dec. 15, 2022 (TW) .................. 111148157

(51) Int. Cl.
*H04R 3/12* (2006.01)
*G06F 3/14* (2006.01)
(Continued)

(52) U.S. Cl.
CPC ............... *H04R 3/12* (2013.01); *G06F 3/14* (2013.01); *G06F 3/162* (2013.01); *G06F 3/165* (2013.01);
(Continued)

(58) Field of Classification Search
CPC .. H04R 3/12; H04R 2420/01; H04R 2430/01; G06F 3/14; G06F 3/162; G06F 3/165;
(Continued)

(56) References Cited

U.S. PATENT DOCUMENTS

2003/0185400 A1* 10/2003 Yoshizawa ....... H04N 21/43615
381/74
2007/0127734 A1* 6/2007 Brulle-Drews .......... H04R 5/04
381/86
(Continued)

FOREIGN PATENT DOCUMENTS

CN 105023593 11/2015
CN 106878125 6/2017
(Continued)

OTHER PUBLICATIONS

"Office Action of Taiwan Counterpart Application", issued on May 29, 2023, p. 1-p. 10.
(Continued)

*Primary Examiner* — Akelaw Teshale

(57) ABSTRACT

The disclosure provides a display including a first audio connector, a second audio connector, a third audio connector, and a mixer and amplifier circuit. The mixer and amplifier circuit is coupled to the first audio connector, the second audio connector, and the third audio connector. The mixer and amplifier circuit broadcasts a first input audio signal corresponding to an output image of a first host device to the first audio connector, the second audio connector, and the third audio connector. The mixer and amplifier circuit broadcasts a second input audio signal from one of the first audio connector, the second audio connector, and the third audio connector to the other two of the first audio connector, the second audio connector, and the third audio connector.

10 Claims, 9 Drawing Sheets

(51) Int. Cl.
*G06F 3/16* (2006.01)
*G06F 13/42* (2006.01)
*G06T 3/40* (2006.01)
*G10L 21/0208* (2013.01)
*H03F 3/183* (2006.01)

(52) U.S. Cl.
CPC ............... *G06F 13/42* (2013.01); *G06T 3/40* (2013.01); *G10L 21/0208* (2013.01); *H03F 3/183* (2013.01); *G10L 2021/02082* (2013.01); *H03F 2200/03* (2013.01); *H04R 2420/01* (2013.01); *H04R 2430/01* (2013.01)

(58) Field of Classification Search
CPC ....... G06F 13/42; G06T 3/40; G10L 21/0208; G10L 2021/02082; H03F 3/183; H03F 2200/03
See application file for complete search history.

(56) References Cited

U.S. PATENT DOCUMENTS

| | | | | |
|---|---|---|---|---|
| 2009/0060226 A1* | 3/2009 | Chen | ......................... | H04R 3/00 381/107 |
| 2011/0037897 A1* | 2/2011 | Chen | ...................... | H04B 1/082 348/565 |
| 2011/0176057 A1* | 7/2011 | Okamura | ............. | H04N 21/439 348/554 |
| 2014/0363018 A1* | 12/2014 | Yoshizawa | ........... | H04N 21/485 381/81 |
| 2015/0098580 A1* | 4/2015 | Halevi | ..................... | H04R 1/06 381/74 |
| 2017/0104460 A1* | 4/2017 | Keskin | ................... | H04R 29/00 |

FOREIGN PATENT DOCUMENTS

| | | |
|---|---|---|
| CN | 114979545 | 8/2022 |
| TW | 200631448 | 9/2006 |
| TW | 200714500 | 4/2007 |
| TW | I620448 | 4/2018 |
| TW | 201844008 | 12/2018 |

OTHER PUBLICATIONS

Intel., "How to Set Up Dual PCs for Streaming", retrieved on May 2023, Available at: https://www.intel.com/content/www/us/en/gaming/resources/dual-pc-streaming.html.

* cited by examiner

DISPLAY

CROSS-REFERENCE TO RELATED APPLICATION

This application claims the priority benefit of Taiwan application serial no. 111148157, filed on Dec. 15, 2022. The entirety of the above-mentioned patent application is hereby incorporated by reference herein and made a part of this specification.

BACKGROUND

Technical Field

The disclosure relates to an electronic device, and particularly relates to a display (or called monitor).

Description of Related Art

A host device can be connected to a display (or called monitor) through a High Definition Multimedia Interface (HDMI) cable, a DisplayPort (DP) cable, or other video cables. The display can display an output image of the host device. For example, an e-sports display can present the output image and audio signal of a personal computer (or game console). Generally, an e-sports display is provided with only one headphone jack. However, in an application scenario where two or more people play against each other using the same game console through the same display, one single headphone jack is not enough to support connection of multiple headsets (headphone microphones).

SUMMARY

The disclosure provides a display configured to be connected to a host device to display an output image of the host device, and providing a function of connecting multiple headsets (headphone microphones).

In an embodiment of the disclosure, the display includes a first audio connector, a second audio connector, a third audio connector, and a mixer and amplifier circuit. The mixer and amplifier circuit is coupled to the first audio connector, the second audio connector, and the third audio connector. The mixer and amplifier circuit broadcasts a first input audio signal corresponding to an output image of a first host device to the first audio connector, the second audio connector, and the third audio connector. The mixer and amplifier circuit broadcasts a second input audio signal from one of the first audio connector, the second audio connector, and the third audio connector to the other two of the first audio connector, the second audio connector, and the third audio connector.

Based on the above, the multiple audio connectors in the embodiments of the disclosure provide a function of connecting multiple headsets. The mixer and amplifier circuit can broadcast the audio signal output by the host device to all the audio connectors. Therefore, in an application scenario where multiple users play against each other using the same host device (for example, a personal computer or a game console), different headsets of all the users can present the audio signal of the host device. The mixer and amplifier circuit can broadcast the input audio signal of any audio connector to other audio connectors. Therefore, in an application scenario where multiple users play against each other, the voice of any user can be transmitted to other users.

In order to make the above-mentioned and other features and advantages of the disclosure more comprehensible, exemplary embodiments will be described in detail hereinafter with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
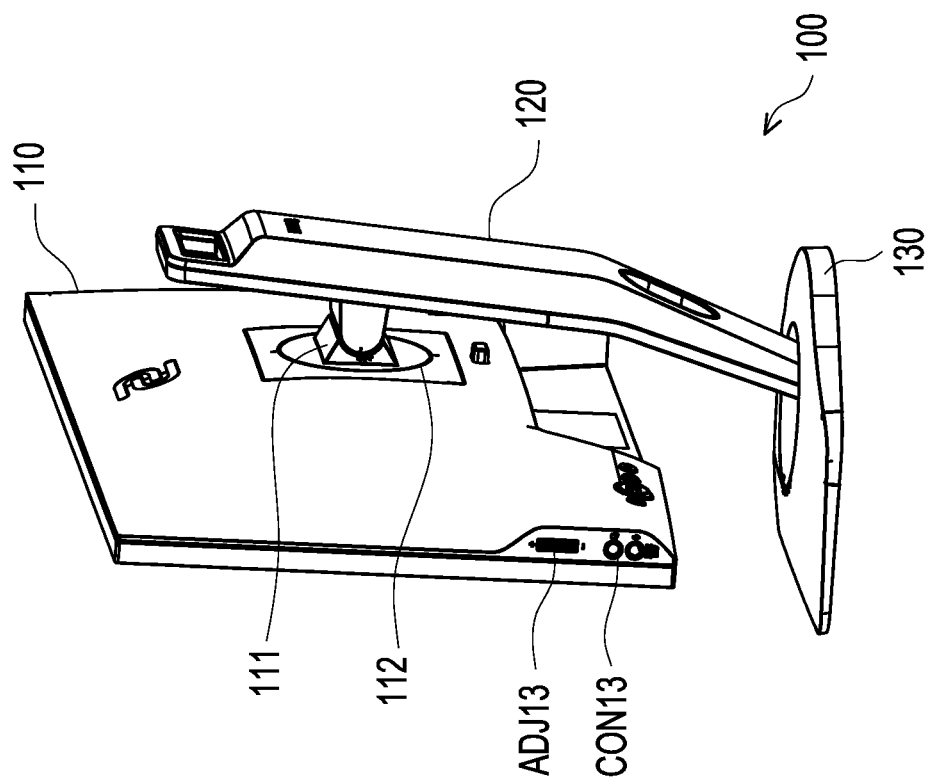
FIG. 1 is a perspective view of a display according to an embodiment of the disclosure.

The term "coupled (or connected)" used throughout this specification (including the claims) may refer to any direct or indirect connection means. For example, if it is described that the first device is coupled (or connected) to the second device, it should be interpreted that the first device can be directly connected to the second device, or the first device can be indirectly connected to the second device through other devices or some connection means. The terms "first" and "second" mentioned in this specification (including the claims) are used to name elements or to distinguish different embodiments or scopes, not to limit the upper limit or lower limit of the number of elements nor limit the sequence of elements. In addition, wherever possible, elements/components/steps using the same reference numerals in the drawings and embodiments represent the same or similar parts. Descriptions of elements/components/steps using the same reference numerals or using the same terms in different embodiments can serve as reference for each other.

FIG. 1 is a perspective view of a display 100 according to an embodiment of the disclosure. Based on actual design and application, the display 100 may be an e-sports display, a multi-audio input/output display, an audio streaming display, or other types of displays. The display 100 shown in FIG. 1 may be connected to a host device (not shown) to display an output image of the host device. Based on actual application scenarios, the host device may be a personal computer, a game console, or other host devices.

FIG. 1 shows a side view of the display 100 from behind. The display 100 includes a display panel module 110, a support frame 120, and a base 130. The first end of the support frame 120 is connected to the base 130. A connection part 111 of the display panel module 110 is connected to the second end of the support frame 120. In the embodiment shown in FIG. 1, the connection part 111 of the display panel module 110 has a rotating shaft 112. The rotating shaft 112 can change the direction of the display panel module 110, so as to place the display panel in a vertical state or a horizontal state. A mixer and amplifier circuit MA1, an audio connector CON11, a volume adjustment interface ADJ11, an audio connector CON13, a volume adjustment interface ADJ13, and an audio connector CON12 are disposed in the display panel module 110. The mixer and amplifier circuit MA1, the audio connector CON11, the volume adjustment interface ADJ11, the audio connector CON13, the volume adjustment interface ADJ13, and the audio connector CON12 will be described in detail in the embodiment shown in FIG. 4.

Figure 2:
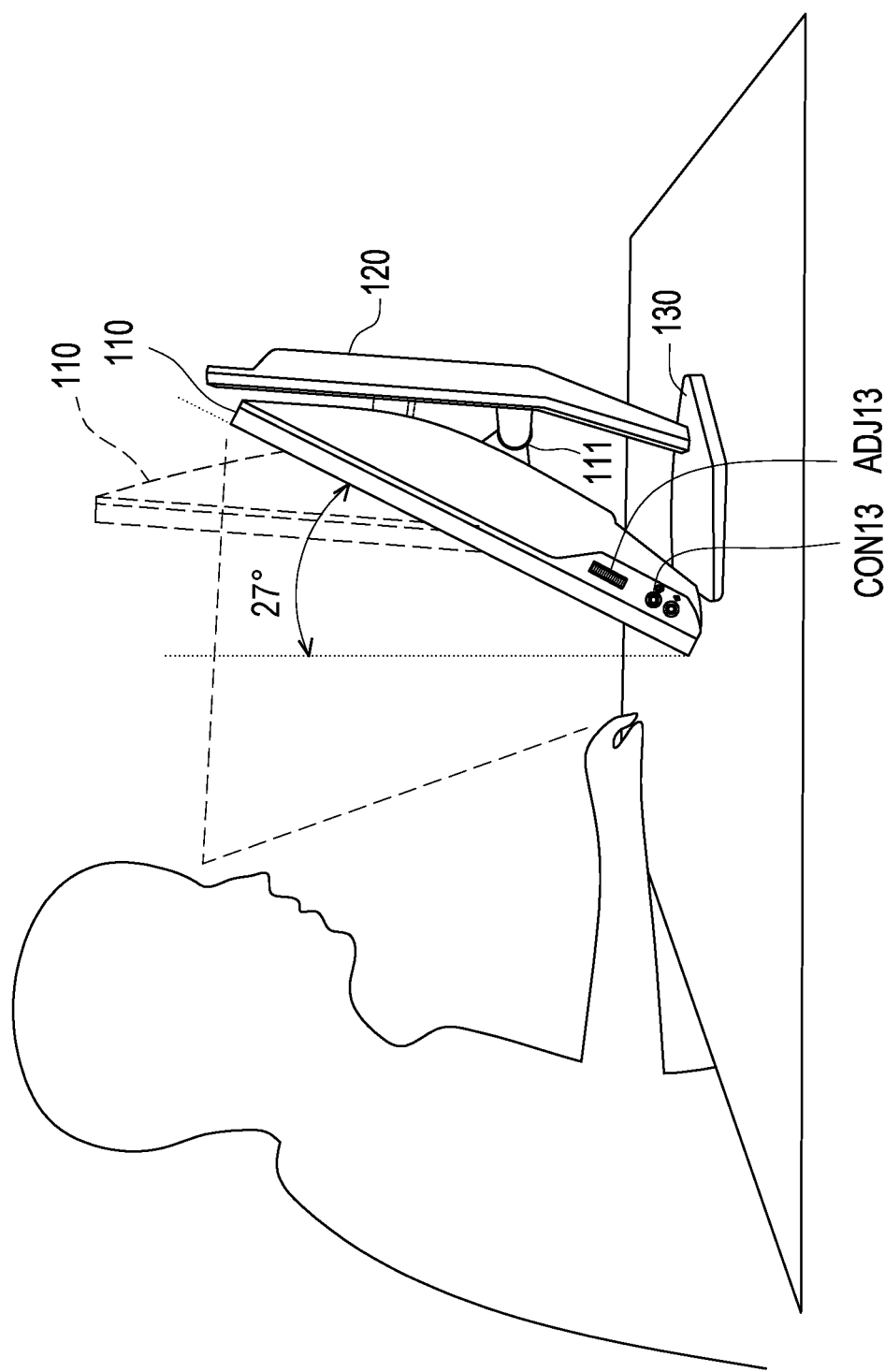
FIG. 2 is a side view of a display according to an embodiment of the disclosure.

FIG. 2 is a side view of a display 100 according to an embodiment of the disclosure. Details of the display panel module 110, the support frame 120, and the base 130 shown in FIG. 2 can be found in the descriptions of the display panel module 110, the support frame 120, and the base 130 shown in FIG. 1. Referring to FIG. 1 and FIG. 2, the second end of the support frame 120 has a sliding mechanism, and the connection part 111 of the display panel module 110 is connected to the sliding mechanism of the support frame 120. The sliding mechanism can change the vertical position of the display panel module 110, so that the angle between the display panel module 110 and the normal direction of the desktop is 0° to 27°, as shown in FIG. 2.

Figure 3:
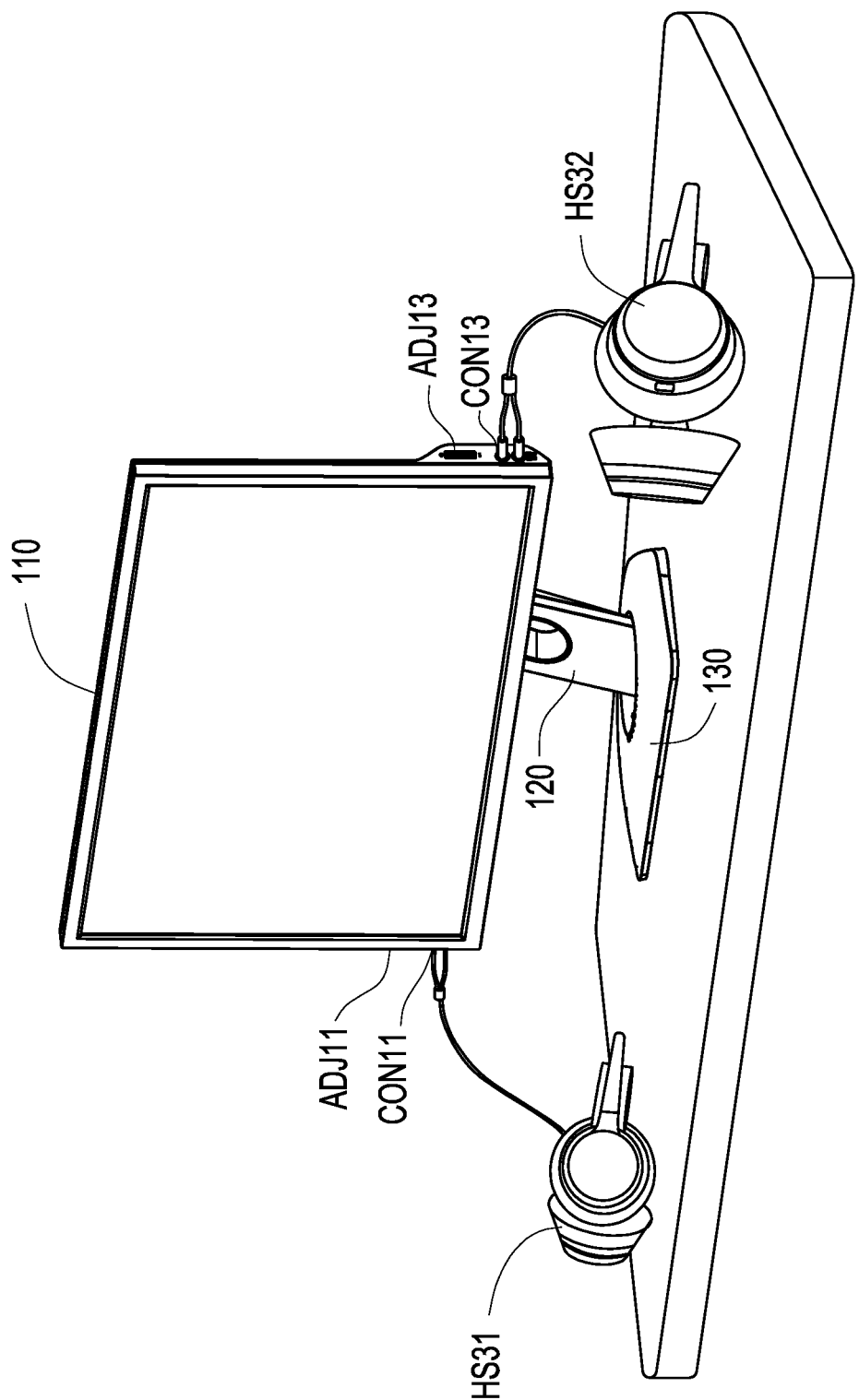
FIG. 3 is a schematic view of an application scenario of a display according to an embodiment of the disclosure.

FIG. 3 is a schematic view of an application scenario of a display 100 according to an embodiment of the disclosure. Details of the display panel module 110, the support frame 120, and the base 130 shown in FIG. 3 can be found in the descriptions of the display panel module 110, the support frame 120, and the base 130 shown in FIG. 1. The multiple audio connectors of the display panel module 110 can provide a function of connecting multiple headsets (headphone microphones). For example, in the application scenario shown in FIG. 3, the cable (audio cable) of the headset HS31 can be connected to the audio connector CON11 of the display panel module 110, and the cable (audio cable) of the other headset HS32 can be connected to the audio connector CON13 of the display panel module 110.

The mixer and amplifier circuit of the display panel module 110 can broadcast the audio signal output by the host device (not shown) to the audio connectors CON11 and CON13.

Therefore, in an application scenario where multiple users play against each other using the same host device (for example, a personal computer or a game console), both the headsets HS31 and HS32 can present the audio signal of the host device. In addition, the mixer and amplifier circuit of the display panel module 110 can broadcast the input audio signal of any audio connector to other audio connectors. Therefore, in an application scenario where multiple users play against each other, the headset HS31 can transmit the voice of the first user to the headset HS32 through the display panel module 110, and the headset HS32 can also transmit the voice of the second user to the headset HS31 through the display panel module 110.

Figure 4:
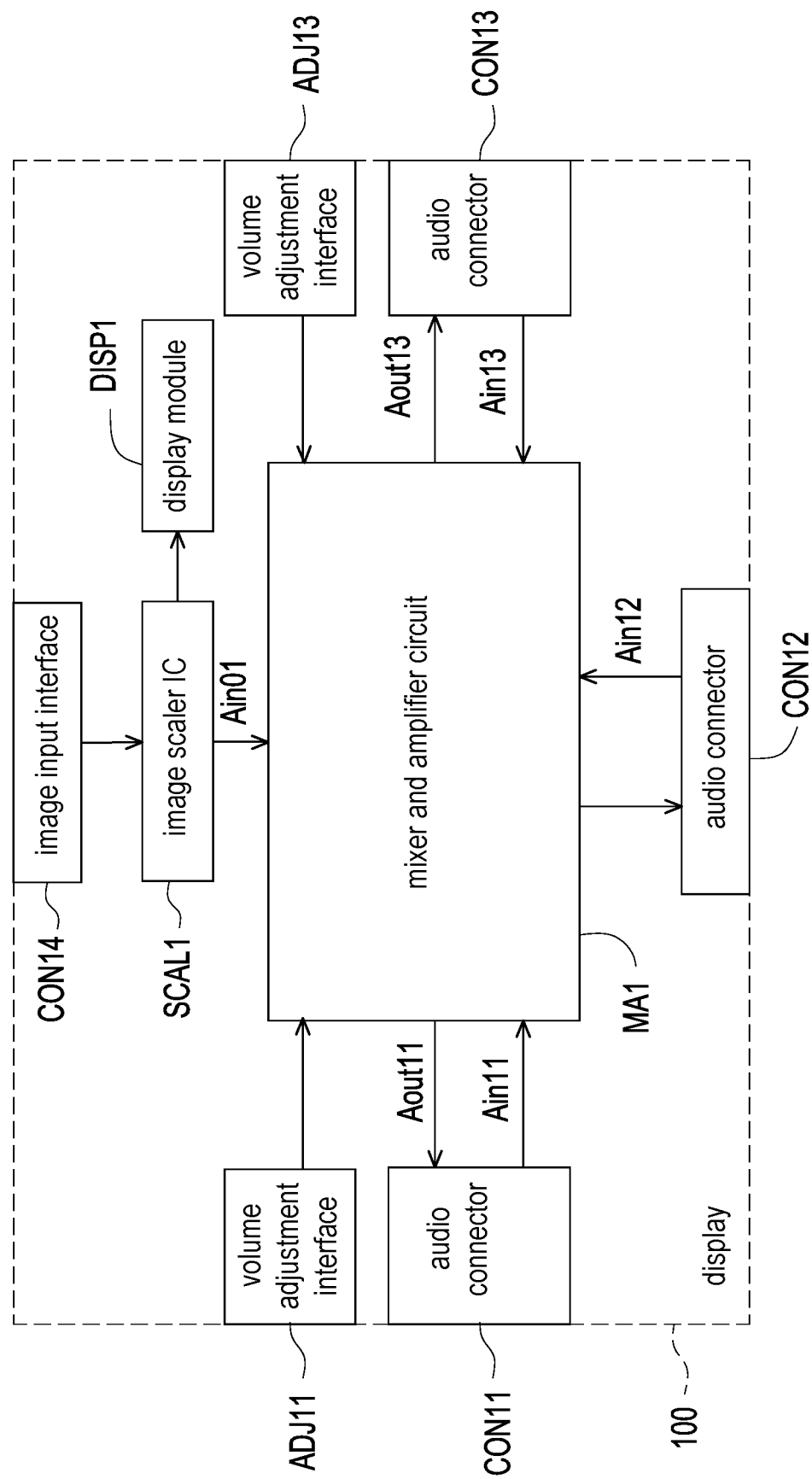
FIG. 4 is a schematic diagram of circuit blocks of a display according to an embodiment of the disclosure.

FIG. 4 is a schematic diagram of circuit blocks of a display 100 according to an embodiment of the disclosure. The display 100 shown in FIG. 4 may be used as an implementation example of the display 100 shown in FIG. 1. In the embodiment shown in FIG. 4, the display 100 includes a mixer and amplifier circuit MA1, an audio connector CON11, a volume adjustment interface ADJ11, an audio connector CON13, a volume adjustment interface ADJ13, an audio connector CON12, an image input interface CON14, an image scaler IC SCAL1, and a display module DISP1. Based on actual design, the image input interface CON14 may include a High Definition Multimedia Interface (HDMI) connector, a DisplayPort (DP) connector or other video and audio transmission connectors. The image input interface CON14 is configured to be connected to the host device (not shown) to receive the output image and audio signal of the host device. Based on actual design and application, the host device is a personal computer or a game console, which may include a personal computer, a game console or other image sources.

The image scaler IC SCAL1 is coupled to the image input interface CON14, the display module DISP1, and the mixer and amplifier circuit MA1. The display module DISP1 includes a display panel (not shown) and a control circuit (not shown, for example, a timing controller). The image scaler IC SCAL1 provides a video signal to the display module DISP1 based on the output image of the host device (not shown), so that the display module DISP1 displays the output image of the host device. The image scaler IC SCAL1 may also provide an input audio signal Ain01 corresponding to the output image to the mixer and amplifier circuit MA1.

The mixer and amplifier circuit MAI is coupled to the audio connectors CON11, CON12, and CON13. Based on actual design, any one of the audio connectors CON11, CON12, and CON13 may include a headset jack, a Universal Serial Bus (USB) connector, or other audio connectors. The image scaler IC SCAL1 may provide the input audio signal Ain01 corresponding to the output image of the host device (not shown) to the mixer and amplifier circuit MA1. The mixer and amplifier circuit MA1 may broadcast the input audio signal Ain01 to the audio connectors CON11, CON12, and CON13. Therefore, in an application scenario where multiple users play against each other using the same host device, different headsets connected to the audio connectors CON11, CON12, and CON13 can all present the input audio signal Ain01 of the host device.

Besides, the mixer and amplifier circuit MA1 may broadcast the input audio signal from one of the audio connectors CON11, CON12, and CON13 to the other two of the audio connectors CON11, CON12, and CON13. For example, the mixer and amplifier circuit MA1 may broadcast an input audio signal Ain11 from the audio connector CON11 to the audio connectors CON12 and CON13, and broadcast an input audio signal Ain12 from the audio connector CON12 to the audio connectors CON11 and CON13, and broadcast an input audio signal Ain13 from the audio connector CON13 to the audio connectors CON11 and CON12. Therefore, in an application scenario where multiple users play against each other, the headset connected to one of the audio connectors CON11, CON12, and CON13 can transmit the voice of the user to the headsets connected to the other two of the audio connectors CON11, CON12, and CON13 through the mixer and amplifier circuit MA1.

The volume adjustment interfaces ADJ11 and ADJ13 are coupled to the mixer and amplifier circuit MA1. This embodiment does not limit how the volume adjustment interfaces ADJ11 and ADJ13 are implemented. According to actual design, in some embodiments, the volume adjustment interfaces ADJ11 and ADJ13 may include a volume adjustment knob, a volume adjustment button, a volume adjustment touch panel, or other user operation interfaces. The mixer and amplifier circuit MA1 outputs an output audio signal Aout11 to the audio connector CON11. The mixer and amplifier circuit MA1 outputs an output audio signal Aout13 to the audio connector CON13. The volume adjustment of the output audio signal Aout11 performed by the mixer and amplifier circuit MA1 may be independent of the volume adjustment of the output audio signal Aout13 performed by the mixer and amplifier circuit MA1. For example, the mixer and amplifier circuit MA1 may perform the volume adjustment for the audio connector CON11 based on the control of the volume adjustment interface ADJ11, and the mixer and amplifier circuit MA1 may perform the volume adjustment for the audio connector CON13 based on the control of the volume adjustment interface ADJ13.

Figure 5:
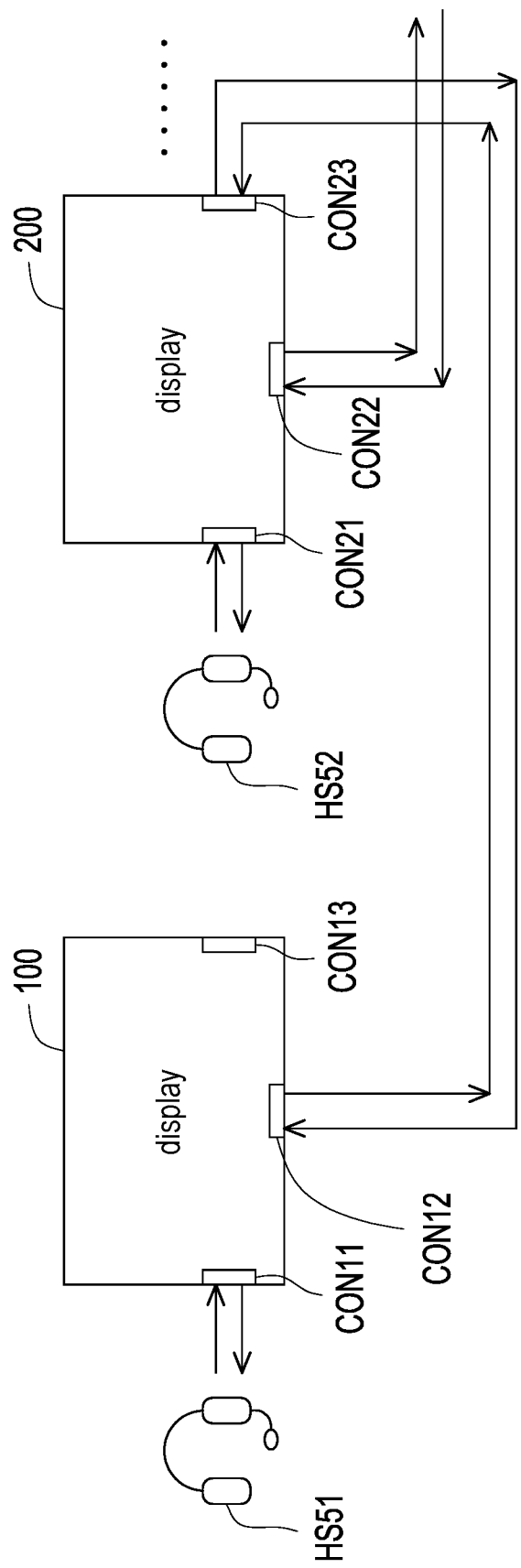
FIG. 5 is a schematic diagram of a display applied to a scenario of multiple audio sources connected in series according to an embodiment of the disclosure.

FIG. 5 is a schematic diagram of a display 100 applied to a scenario of multiple audio sources connected in series according to an embodiment of the disclosure. In the application scenario shown in FIG. 5, multiple displays are connected in series through cables (audio cables). For example, the audio connector CON12 of the display 100 is connected to an audio connector CON23 of another display 200 through a cable (audio cable), and an audio connector CON22 of the display 200 is connected to the next display (not shown) through another cable (audio cable). In the application scenario shown in FIG. 5, the cable (audio cable) of the headset (headphone microphone) HS51 can be connected to the audio connector CON11 of the display 100, and the cable (audio cable) of another headset HS52 can be connected to the audio connector CON21 of the display 200. Details of the display 100 shown in FIG. 5 can be found in the descriptions of the display 100 shown in FIG. 1 and FIG. 4, and details of the display 200, the audio connector CON21, the audio connector CON22, and the audio connector CON23 shown in FIG. 5 can be found in the descriptions of the display 100, the audio connector CON11, the audio connector CON12, and the audio connector CON13, and will not be repeated here.

Referring to FIG. 4 and FIG. 5, when the audio connector CON11 is connected to the headset HS51 and one of the audio connector CON12 and the audio connector CON13 is connected to another display, the mixer and amplifier circuit MA1 may broadcast the input audio signal Ain11 from the headset HS51 to another display. For example, the voice signal of the headset HS51 may be transmitted to the headset HS52 through the audio connector CON11, the audio connector CON12, the audio connector CON23, and the audio connector CON21. In addition, the mixer and amplifier circuit MA1 may also broadcast the input audio signals (Ain12 and/or Ain13) from other displays to the headset HS51. For example, the voice signal of the headset HS52 may be transmitted to the headset HS51 through the audio connector CON21, the audio connector CON23, the audio connector CON12, and the audio connector CON11. Therefore, different users can communicate with each other through the headset HS51 and the headset HS52.

Figure 6:
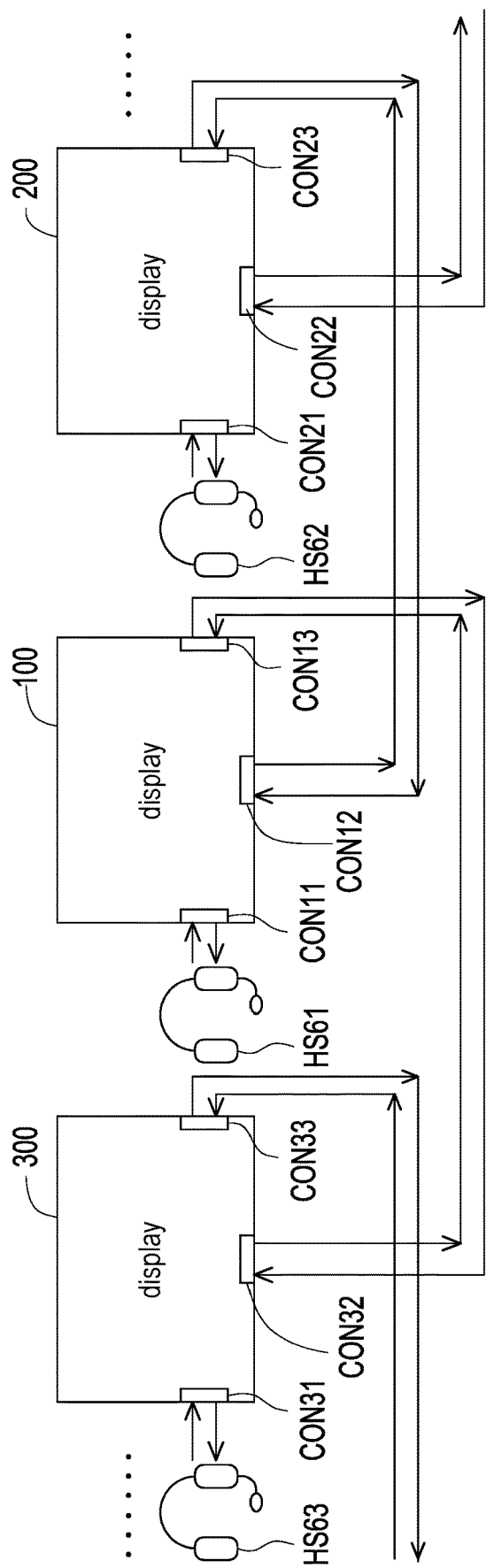
FIG. 6 is a schematic diagram of a display applied to a scenario of multiple audio sources connected in series according to another embodiment of the disclosure.

FIG. 6 is a schematic diagram of a display 100 applied to a scenario of multiple audio sources connected in series according to another embodiment of the disclosure. In the application scenario shown in FIG. 6, multiple displays are connected in series through cables (audio cables). For example, the audio connector CON33 of the display 300 is connected to the previous display (not shown), the audio connector CON32 of the display 300 is connected to the audio connector CON13 of the display 100, the audio connector CON12 of the display 100 is connected to the audio connector CON23 of the display 200, and the audio connector CON22 of the display 200 is connected to the next display (not shown). In the application scenario shown in FIG. 6, the cable (audio cable) of the headset (headphone microphone) HS61 can be connected to the audio connector CON11 of the display 100, the cable (audio cable) of the headset HS62 can be connected to the audio connector CON21 of the display 200, and the cable (audio cable) of the headset HS63 can be connected to the audio connector CON31 of the display 300. Details of the display 100 shown in FIG. 6 can be found in the descriptions of the display 100 shown in FIG. 1 and FIG. 4. Details of the display 200, the audio connector CON21, the audio connector CON22, and the audio connector CON23 shown in FIG. 6 can be found in the descriptions of the display 100, the audio connector CON11, the audio connector CON12, and the audio connector CON13. Details of the display 300, the audio connector CON31, the audio connector CON32, and the audio connector CON33 shown in FIG. 6 can be found in the descriptions of the display 100, the audio connector CON11, the audio connector CON12, and the audio connector CON13, and will not be repeated here.

Referring to FIG. 4 and FIG. 6, when the audio connector CON11 is connected to the headset HS61, the audio connector CON12 is connected to another display 200, and the audio connector CON13 is connected to another display 300, the mixer and amplifier circuit MA1 can broadcast the input audio signal Ain11 from the headset HS61 to other displays 200 and 300. For example, the voice signal of the headset HS61 may be transmitted to the headsets HS62 and HS63 through the displays 100, 200, and 300. In addition, the mixer and amplifier circuit MA1 can broadcast the input audio signal Ain12 from the other display 200 to the headset HS61 and the other display 300. For example, the voice signal of the headset HS62 may be transmitted to the headsets HS61 and HS63 through the displays 200, 100, and 300. In addition, the mixer and amplifier circuit MA1 can broadcast the input audio signal Ain13 from the other display 300 to the headset HS61 and the other display 200. For example, the voice signal of the headset HS63 may be transmitted to the headsets HS61 and HS62 through the displays 300, 100, and 200. Therefore, different users can communicate with each other through the headset HS61, the headset HS62, and the headset HS63.

Figure 7:
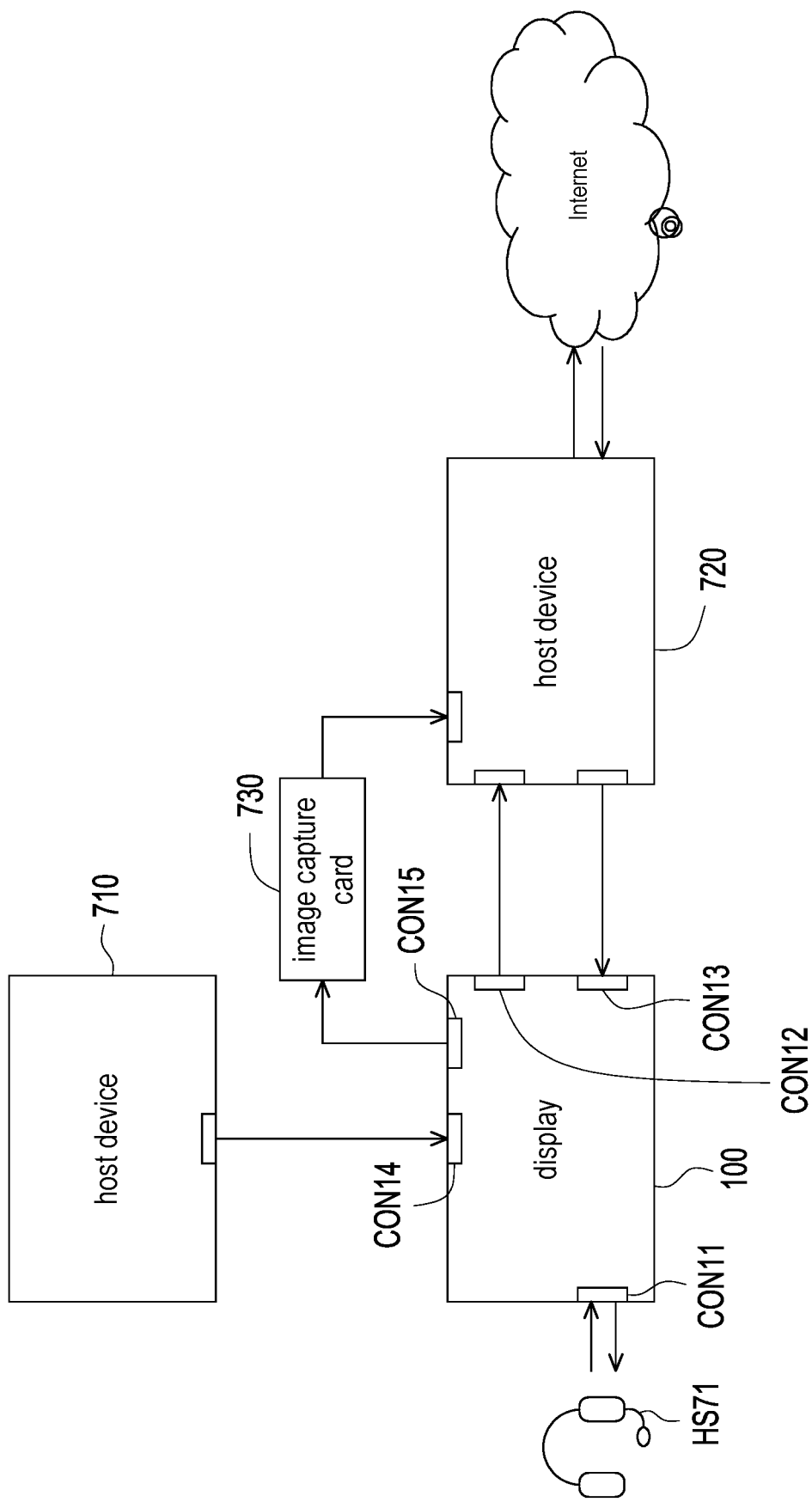
FIG. 7 is a schematic diagram of a display applied to a scenario of two hosts (live broadcast scenario) according to yet another embodiment of the disclosure.

FIG. 7 is a schematic diagram of a display 100 applied to a scenario of two hosts (live broadcast scenario) according to yet another embodiment of the disclosure. In the application scenario shown in FIG. 7, the display 100 is connected to multiple host devices 710 and 720 through cables. For example, the image input interface CON14 of the display 100 is connected to the host device 710 (for example, a game console or a personal computer), and the audio connectors CON12 and CON13 of the display 100 are connected to the host device 720 (for example, a personal computer). The host device 720 is also connected to the Internet. Therefore, the host device 720 can be used as a live streaming host. In the application scenario shown in FIG. 7, the cable (audio cable) of the headset (headphone microphone) HS71 can be connected to the audio connector CON11 of the display 100. Details of the display 100 shown in FIG. 7 can be found in the descriptions of the display 100 shown in FIG. 1 and FIG. 4, and will not be repeated here.

In the embodiment shown in FIG. 7, the display 100 further includes an image output interface CON15 to be connected to the input end of an image capture card 730. The output end of the image capture card 730 is connected to the image input connector of the host device 720. Based on actual design, the image input interface CON14 may include an HDMI connector, a DP connector, a USB connector, or other video and audio transmission connectors, and the image output interface CON15 may include an HDMI connector, a DP connector, a USB connector or other video and audio transmission connectors. Referring to FIG. 4 and FIG. 7, the mixer and amplifier circuit MA1 of the display 100 can transmit the output image from the host device 710 to the image output interface CON15. Therefore, the image capture card 730 can capture the video stream of the host device 710 and then provide the video stream of the host device 710 to the host device 720. The host device 720 can upload the video stream of the host device 710 to a live broadcast platform (not shown) through the Internet.

When the audio connector CON11 is connected to the headset HS71, the audio connector CON13 is connected to the audio output connector of the host device 720, and the audio connector CON12 is connected to the audio input connector of the host device 720, the mixer and amplifier circuit MA1 of the display 100 can broadcast the input audio signal Ain01 from the host device 710 and the input audio signal Ain11 from the headset HS71 to the audio input connector of the host device 720. The host device 720 can upload the audio signal of the host device 710 and the audio signal of the headset HS71 to a live broadcast platform (not shown) through the Internet. In addition, the mixer and amplifier circuit MAI can broadcast the input audio signal Ain13 from the audio output connector of the host device 720 to the headset HS71. Therefore, the user can hear the live notification audio from the live broadcast platform through the headset HS71.

Figure 8:
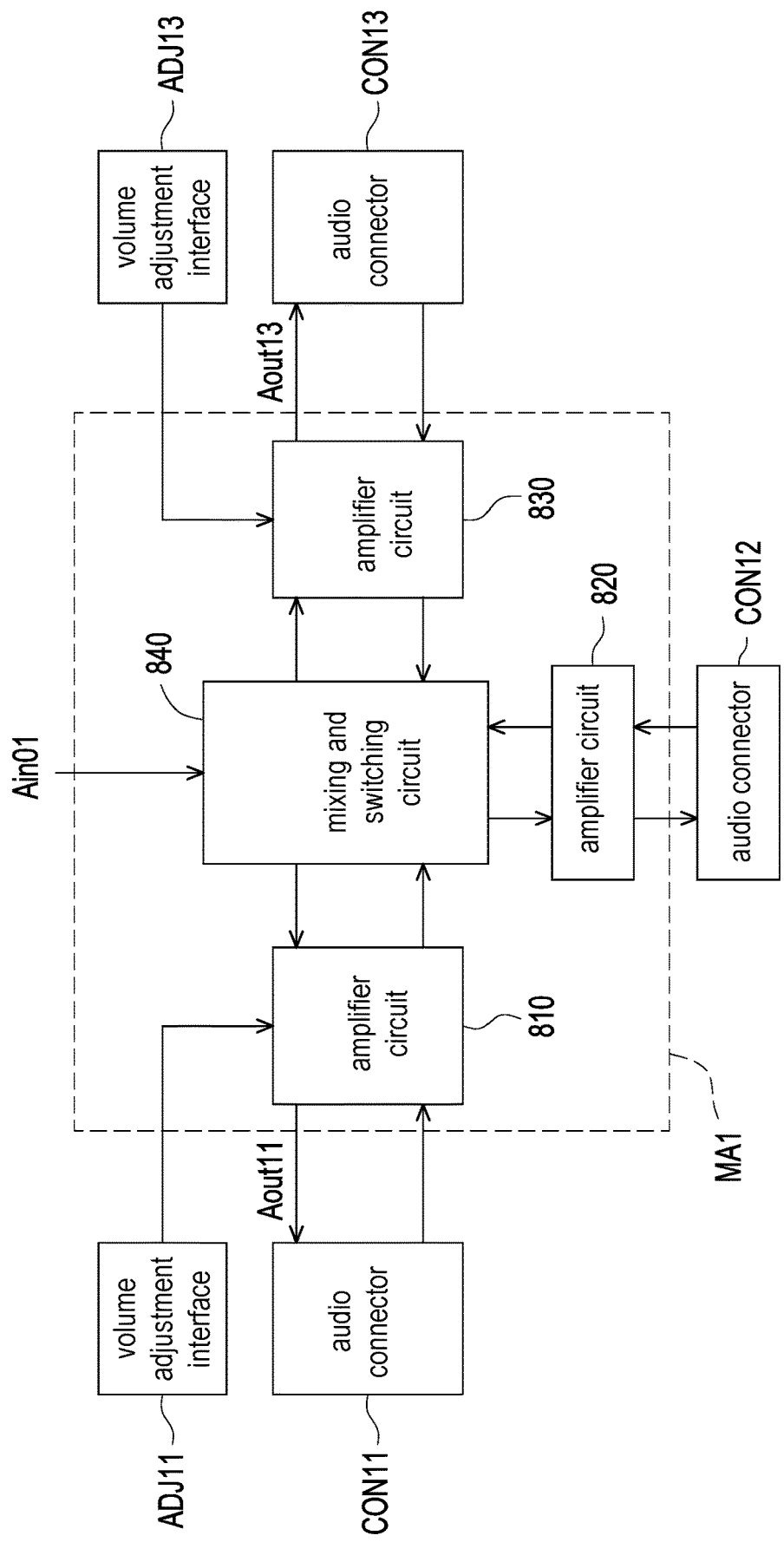
FIG. 8 is a schematic diagram of circuit blocks of a mixer and amplifier circuit according to an embodiment of the disclosure.

FIG. 8 is a schematic diagram of circuit blocks of a mixer and amplifier circuit MA1 according to an embodiment of the disclosure. The mixer and amplifier circuit MAI shown in FIG. 8 can be used as an implementation example of the mixer and amplifier circuit MAI shown in FIG. 4. In the embodiment shown in FIG. 8, the mixer and amplifier circuit MA1 includes an amplifier circuit 810, an amplifier circuit 820, an amplifier circuit 830, and a mixing and switching circuit 840. The amplifier circuit 810 is coupled to the audio connector CON11 and the volume adjustment interface ADJ11. The amplifier circuit 830 is coupled to the audio connector CON13 and the volume adjustment interface ADJ13. The amplifier circuit 820 is coupled to the audio connector CON12. The mixing and switching circuit 840 is coupled to the amplifier circuits 810, 820, and 830. This embodiment does not limit how the mixing and switching circuit 840 is implemented. According to actual design, in some embodiments, the mixing and switching circuit 840 may include a well-known mixer circuits or other mixer circuits. The mixing and switching circuit 840 can broadcast the input audio signal Ain01 corresponding to the output image of the host device (not shown) to the amplifier circuits 810, 820, and 830. The amplifier circuit 810 can amplify the input audio signal Ain01, and then output the amplified audio signal to the audio connector CON11. Details of the amplifier circuits 820 and 830 can be found in the descriptions of the amplifier circuit 810, and will not be repeated here. Therefore, in an application scenario where multiple users play against each other using the same host device, different headsets connected to the audio connectors CON11, CON12, and CON13 can all present the input audio signal Ain01 of the host device.

The amplifier circuit 810 can also amplify the input audio signal from the audio connector CON11, and then output the amplified audio signal to the mixing and switching circuit 840. Details of the amplifier circuits 820 and 830 can be found in the descriptions of the amplifier circuit 810, and will not be repeated here. The mixing and switching circuit 840 can broadcast the input audio signal (amplified audio signal) from one of the amplifier circuits 810, 820, and 830 to the other two of the amplifier circuits 810, 820, and 830. For example, the mixing and switching circuit 840 may broadcast the input audio signal from the amplifier circuit 810 to the amplifier circuits 820 and 830, broadcast the input audio signal from the amplifier circuit 820 to the amplifier circuits 810 and 830, and broadcast the input audio signal from the amplifier circuit 830 to the amplifier circuits 810 and 820. Therefore, in an application scenario where multiple users play against each other, the headset connected to one of the audio connectors CON11, CON12, and CON13 can transmit the voice of the user to the headsets connected to the other two of the audio connectors CON11, CON12, and CON13 through the mixing and switching circuit 840.

The volume adjustment interfaces ADJ11 and ADJ13 are respectively coupled to the amplifier circuits 810 and 830. The volume adjustment of the output audio signal Aout11 performed by the amplifier circuit 810 can be independent of the volume adjustment of the output audio signal Aout13 performed by the amplifier circuit 830. For example, the amplifier circuit 810 may perform the volume adjustment for the audio connector CON11 based on the control of the volume adjustment interface ADJ11, and the amplifier circuit 830 may perform the volume adjustment for the audio connector CON13 based on the control of the volume adjustment interface ADJ13.

Figure 9:
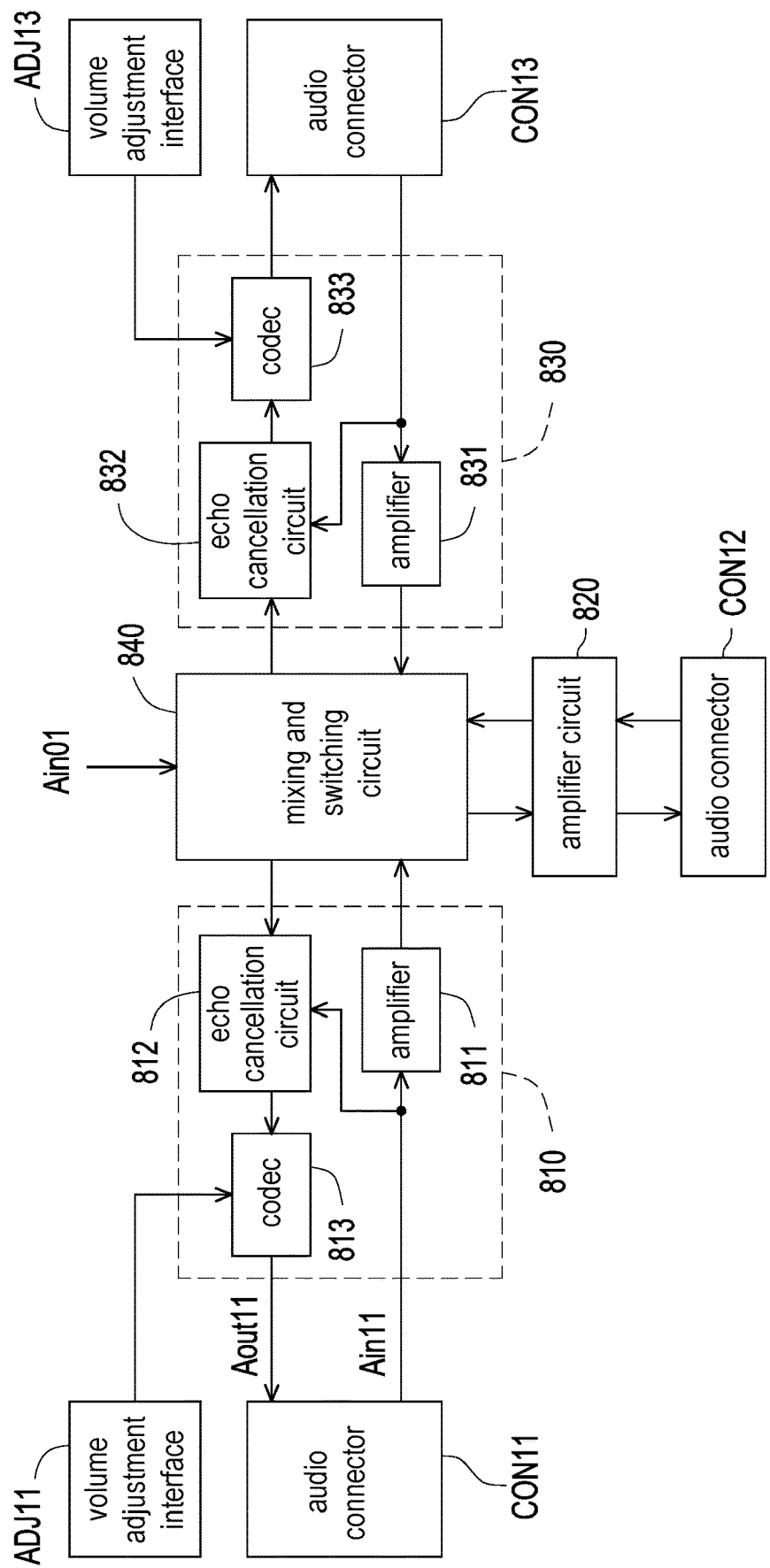
FIG. 9 is a schematic diagram of circuit blocks of an amplifier circuit according to an embodiment of the disclosure.

FIG. 9 is a schematic diagram of circuit blocks of the amplifier circuits 810 and 830 according to an embodiment of the disclosure. The amplifier circuits 810 and 830 shown in FIG. 9 can be used as an implementation example of the amplifier circuits 810 and 830 shown in FIG.

8. In the embodiment shown in FIG. 9, the amplifier circuit 810 includes an amplifier 811, an echo cancellation circuit 812, and a codec 813, and the amplifier circuit 830 includes an amplifier 831, an echo cancellation circuit 832, and a codec 833. The amplifier 811 is coupled to the audio connector CON11 and the mixing and switching circuit 840. The amplifier 811 can amplify the input audio signal Ain11 from the audio connector CON11 and transmit the amplified audio signal to the mixing and switching circuit 840. This embodiment does not limit how the amplifier 811 is implemented. According to actual design, in some embodiments, the amplifier 811 may include a well-known amplifier circuit or other amplifier circuits.

The echo cancellation circuit 812 is coupled to the audio connector CON11 and the mixing and switching circuit 840. The echo cancellation circuit 812 can perform echo cancellation on the output audio signal from the mixing and switching circuit 840 according to the input audio signal Ain11 from the audio connector CON11, to generate an echo-canceled signal to the codec 813. This embodiment does not limit how the echo cancellation circuit 812 is implemented. According to actual design, in some embodiments, the echo cancellation circuit 812 may include a well-known echo cancellation circuit or other echo cancellation circuits.

The codec 813 is coupled to the echo cancellation circuit 812 to receive the echo-canceled signal. Based on the control of the volume adjustment interface ADJ11, the codec 813 can adjust the volume of the echo-canceled signal to generate an adjusted volume signal (output audio signal Aout11) to the audio connector CON11. This embodiment does not limit how the codec 813 is implemented. According to actual design, in some embodiments, the codec 813 may include a well-known audio codec circuit or other audio codec circuits. Details of the amplifier circuit 830, the amplifier 831, the echo cancellation circuit 832, and the codec 833 can be found in the descriptions of the amplifier circuit 810, the amplifier 811, the echo cancellation circuit 812, and the codec 813, and will not be repeated here.

To sum up, the audio connectors CON11, CON12, and CON13 in the above embodiments can provide a function of connecting multiple headsets. The mixing and switching circuit 840 of the mixer and amplifier circuit MA1 can broadcast the audio signal Ain01 output by the host device to all the audio connectors CON11, CON12, and CON13. Therefore, in an application scenario where multiple users play against each other using the same host device (for example, a personal computer or a game console), different headsets of all the users can present the audio signal Ain01 of the host device. The mixing and switching circuit 840 of the mixer and amplifier circuit MA1 can also broadcast the input audio signal of any audio connector to other audio connectors. Therefore, in an application scenario where multiple users play against each other, the voice of any user can be transmitted to other users.

Although the disclosure has been described with reference to the embodiments above, they are not intended to limit the disclosure. Those skilled in the art may make changes and modifications without departing from the spirit and scope of the disclosure. Therefore, the scope of protection of the disclosure should be defined by the following claims.

What is claimed is:

1. A display configured to be connected to a first host device to display an output image of the first host device, the display comprising:
    a first audio connector;
    a second audio connector;
    a third audio connector; and
    a mixer and amplifier circuit coupled to the first audio connector, the second audio connector, and the third audio connector, wherein the mixer and amplifier circuit broadcasts a first input audio signal corresponding to the output image of the first host device simultaneously to the first audio connector, the second audio connector, and the third audio connector,
    wherein the mixer and amplifier circuit is further configured to receive a second input audio signal from an external source through any one of the first audio connector, the second audio connector and the third audio connector coupled to the external source,
    wherein the mixer and amplifier circuit broadcasts the second input audio signal received from one of the first audio connector, the second audio connector, and the third audio connector simultaneously to the other two of the first audio connector, the second audio connector, and the third audio connector.

2. The display according to claim 1, further comprising:
    an image input interface connected to the first host device to receive the output image and the first input audio signal;
    a display module; and
    an image scaler IC coupled to the image input interface, the display module, and the mixer and amplifier circuit, wherein the image scaler IC provides a video signal to the display module to enable the display module to display the output image, and the image scaler IC provides the first input audio signal corresponding to the output image to the mixer and amplifier circuit.

3. The display according to claim 1, wherein the mixer and amplifier circuit outputs a first output audio signal to the first audio connector, the mixer and amplifier circuit outputs a second output audio signal to the second audio connector, and a first volume adjustment of the first output audio signal performed by the mixer and amplifier circuit is independent of a second volume adjustment of the second output audio signal performed by the mixer and amplifier circuit.

4. The display according to claim 3, further comprising:
    a first volume adjustment interface coupled to the mixer and amplifier circuit, wherein the mixer and amplifier circuit performs the first volume adjustment for the first audio connector based on control of the first volume adjustment interface; and
    a second volume adjustment interface coupled to the mixer and amplifier circuit, wherein the mixer and amplifier circuit performs the second volume adjustment for the second audio connector based on control of the second volume adjustment interface.

5. The display according to claim 1, wherein in response to the first audio connector being connected to a headset and one of the second audio connector and the third audio connector being connected to another display, the mixer and amplifier circuit broadcasts the second input audio signal from the headset to the another display, and the mixer and amplifier circuit broadcasts a third input audio signal from the another display to the headset.

6. The display according to claim 1, wherein in response to the first audio connector being connected to a headset, the second audio connector being connected to a first other display, and the third audio connector being connected to a second other display, the mixer and amplifier circuit broadcasts the second input audio signal from the headset to the first other display and the second other display, the mixer and amplifier circuit broadcasts a third input audio signal from the first other display to the headset and the second other display, and the mixer and amplifier circuit broadcasts a fourth input audio signal from the second other display to the headset and the first other display.

7. The display according to claim 1, wherein in response to the first audio connector being connected to a headset, the second audio connector being connected to an audio output connector of a second host device, and the third audio connector being connected to an audio input connector of the second host device, the mixer and amplifier circuit broadcasts the first input audio signal from the first host device and the second input audio signal from the headset to the audio input connector of the second host device, and the mixer and amplifier circuit broadcasts a third input audio signal from the audio output connector of the second host device to the headset.

8. The display according to claim 1, wherein the mixer and amplifier circuit comprises:
    a first amplifier circuit coupled to the first audio connector;
    a second amplifier circuit coupled to the second audio connector;
    a third amplifier circuit coupled to the third audio connector; and
    a mixing and switching circuit coupled to the first amplifier circuit, the second amplifier circuit, and the third amplifier circuit, wherein the mixing and switching circuit broadcasts the first input audio signal corresponding to the output image of the first host device to the first amplifier circuit, the second amplifier circuit, and the third amplifier circuit, and the mixing and switching circuit broadcasts the second input audio signal from one of the first amplifier circuit, the second amplifier circuit, and the third amplifier circuit to the other two of the first amplifier circuit, the second amplifier circuit, and the third amplifier circuit.

9. The display according to claim 8, wherein the first amplifier circuit comprises:
an amplifier coupled to the first audio connector and the mixing and switching circuit, and amplifying and transmitting the second input audio signal from the first audio connector to the mixing and switching circuit;
an echo cancellation circuit coupled to the first audio connector and the mixing and switching circuit, and performing an echo cancellation on an output audio signal from the mixing and switching circuit according to the second input audio signal from the first audio connector to generate an echo-canceled signal; and
a codec coupled to the echo cancellation circuit to receive the echo-canceled signal, wherein the codec adjusts a volume of the echo-canceled signal based on control of a volume adjustment interface to generate an adjusted volume signal to the first audio connector.

10. The display according to claim 1, further comprising:
a base;
a support frame having a first end connected to the base; and
a display panel module having a connection part connected to a second end of the support frame, wherein the mixer and amplifier circuit, the first audio connector, the second audio connector, and the third audio connector are disposed in the display panel module,
wherein the second end of the support frame has a sliding mechanism for changing a vertical position of the display panel module, and the connection part has a rotating shaft for changing a direction of the display panel module.

* * * * *